United States Patent [19]

Wiese, Jr.

[11] 4,006,018
[45] Feb. 1, 1977

[54] COPYING IN COLOR

[75] Inventor: Joseph A. Wiese, Jr., St. Paul, Minn.

[73] Assignee: Minnesota Mining and Manufacturing Company, St. Paul, Minn.

[22] Filed: Sept. 10, 1975

[21] Appl. No.: 611,876

Related U.S. Application Data

[63] Continuation of Ser. No. 728,167, May 10, 1968, abandoned.

[52] U.S. Cl. .................. 96/1.2; 96/17; 96/30; 427/56; 101/469; 101/470; 250/317
[51] Int. Cl.² .................. G03G 13/22; G03C 7/16
[58] Field of Search .................. 96/1.2, 5, 6, 7, 8, 96/9, 17, 23, 29 D, 30; 427/56; 101/469, 470; 250/317

[56] References Cited

UNITED STATES PATENTS

| | | | |
|---|---|---|---|
| 1,430,059 | 9/1922 | Decks | 96/30 X |
| 2,203,652 | 6/1940 | Ehrenfried | 96/6 |
| 2,983,606 | 5/1961 | Rogers | 96/29 D X |
| 3,226,227 | 12/1965 | Wolff | 96/1 R |
| 3,241,996 | 3/1966 | Haas | 427/56 |
| 3,280,735 | 10/1966 | Clark et al. | 427/56 X |
| 3,455,687 | 7/1969 | Holstead et al. | 96/27 R |
| 3,458,310 | 7/1969 | Arneth et al. | 96/1.2 |
| 3,810,758 | 5/1974 | Tulagin et al. | 96/5 X |

FOREIGN PATENTS OR APPLICATIONS

| | | | |
|---|---|---|---|
| 966,694 | 8/1964 | United Kingdom | 96/1.5 |
| 947,479 | 1/1964 | United Kingdom | 96/1.2 |

*Primary Examiner*—Roland E. Martin, Jr.
*Attorney, Agent, or Firm*—Dean P. Edmundson

[57] ABSTRACT

A process is described for performing color separations from a light-image of a colored original and for separately printing corresponding color separation images in registry onto a print sheet to provide a full color reproduction. The printing step is accomplished by thermographic dry image forming techniques.

16 Claims, 2 Drawing Figures

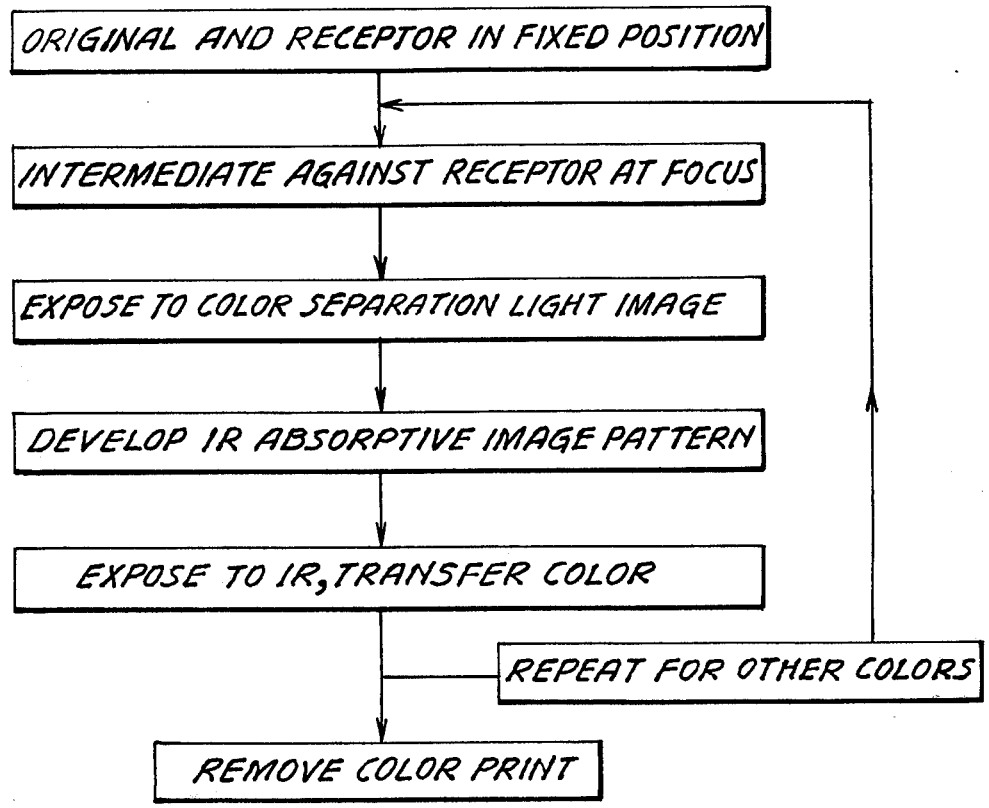
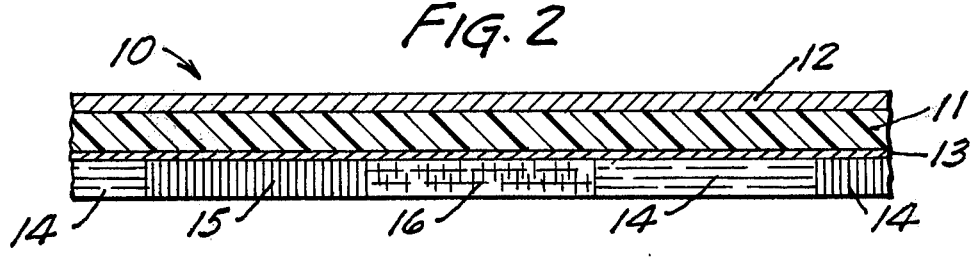

COPYING IN COLOR

This a continuation of application Ser. No. 728,167 filed May 10, 1968, now abandoned.

This invention relates to the copying of colored originals in color. In one aspect the invention relates to a method wherein separate sections of intermediate sheet material are each first provided with a differentially radiation-absorptive image pattern corresponding to a different color separation light-image of the original, and color material is then heat-transferred to a receptor or print sheet from an intervening source layer by irradiation of each of the patterned areas in sequence and in registry on the print sheet. In one important aspect the invention relates to a method as just described wherein the image-defining and preferentially radiation-absorptive pattern is formed at the non-light-struck areas of a photosensitive surface layer on an intermediate sheet having at its opposite surface a layer of heat-transferable dye of a color complementary to the color separation light-image. A further aspect of the invention relates to the method of obtaining precise registry of the several colors in the print by maintaining the original and the print sheet in mutually optically fixed positions while forming the several color separation patterns and monocolor transfer prints. Although some of the method steps may involve wet processing, the invention in a preferred aspect involves a completely dry, automatic, and surprisingly rapid process for making copies of colored scenes, prints, transparencies or other originals in full color and to any desired dimensions.

The invention in a related aspect involves novel intermediate sheet materials useful particularly in the automatic dry process and comprising an extended-length thin sheet material having on one surface a photosensitive layer and on the opposite surface a series of successive sequences of coatings of transferable color materials.

In practicing the invention, a light-image of the original is first focused onto a photosensitive surface and a color separation is made. Separation by means of color filters is preferred, typically by red, blue and green primary-color filters placed sequentially in the path of the light beam. Equivalent color separation may be obtained by employing a sequence of selectively spectrally sensitized photosensitive surfaces, in which case no separate filters are required.

The differential pattern produced in the photosensitive surface by exposure to the light-image is used to provide an appropriate differentially radiation-absorptive pattern. With some photosensitive materials an increase in absorptivity for infra-red radiation is achieved directly and without any visible change by exposure to the colored light-image. Photosensitive coatings which undergo a change in conductivity on exposure to light may subsequently be treated with toner powders or with electrolytic plating solutions or suspensions, or preferably with electrically conductive powder materials applied at high potential, to produce the required differentially radiation-absorptive pattern. Certain chemically reactive photosensitive coatings are rendered non-reactive on exposure to light and this property too may be utilized. Photosensitive silver halide coatings may be used, either by direct conversion to radiation-absorptive silver residue at exposed areas or by chemical development subsequent to exposure. The resultant imaged sheet may itself then be irradiated, or may be involved in further processing to provide the required differentially infra-red-absorptive pattern. An example of the latter involves formation of a lithographic master and preparation of the infra-red-absorptive image-defining areas by offset printing.

Brief exposure of the patterned surface to intense radiation, most particularly to infra-red radiation, produces a heating effect at the preferentially radiation-absorptive image-defining areas. The resultant heat-pattern is conducted through the thin sheet without any significant lateral spreading or loss of definition. In some modifications of the process, the conduction of the heat-pattern at a suitably high temperature to the print sheet is alone sufficient to provide a color change and may be used to produce a portion of the color of the final copy. Since the print sheet in such cases remains susceptible to further color change on subsequent heating, it is generally preferred to transfer physical materials as the color transfer agencies. Typical of such materials are the volatilizable dyes, as well as volatilizable reactants for color-producing co-reactant compounds. Combinations of these various systems may be used. A separate source sheet may be used for all such physical transfer materials, such sheet being placed between and in pressure-contact with both the print sheet and the patterned intermediate. Improved convenience in operation and some improvement in print quality are obtained by applying the transfer material directly to the reverse surface of the intermediate.

Volatilizable dyes constitute a preferred form of color transfer material. The dyes are desirably removably retained by a binder on the reverse surface of the intermediate, and in just sufficient concentration to assure the desired color intensity in the print when transferred thereto by heating. Transferable reactant materials which react with co-reactant components of a print sheet to form color-bodies, or to decolorize colored components, are also effective but require more specific print sheet formulations and hence are not universally applicable. Combinations of the several methods are frequently of value. The use of volatilizable dyes in conjunction with temporary print sheets makes possible the re-transfer of the completed print to one or more permanent receptor or print sheets. As an example, a print prepared by volatilization of dyes onto bond paper, and exhibiting muddy-appearing color images of low image density, may be placed against a series of dye-retentive print sheets, and subjected to over-all heating while in contact with each, to produce a number of full-color mirror-image prints having relatively clear and dense colors.

Heat-induced transfer of color materials to a print sheet and in registry may be accomplished using separate transfer intermediates; but such methods require placing each successive sheet in precise registry with the position of the preceding sheets and involve close visual inspection, or complicated automatic mechanism, or other means of registry; and the sheet materials must be carefully protected against conditions tending to cause dimensional change. In its preferred form the present invention completely avoids all such difficulties by forming the preferentially radiation-absorptive areas, and irradiating to cause transfer of color material, while the intermediate sheet remains positioned against the print sheet. The process is repeated for each color separation while maintaining the original and the print sheet in mutually optically fixed positions.

In the drawing,

FIG. 1 is a diagrammatic representation of a preferred method of copying in accordance with the principles of the invention, and FIG. 2 is a schematic cross-sectional representation of a preferred form of photosensitive color transfer intermediate.

As indicated in FIG. 1, in a preferred method the original, such as a colored picture from a magazine or a photographic positive color transparency, and a receptor or print sheet are placed in mutually fixed position so that a light image of the original may be projected toward the print sheet. A first photosensitive color transfer intermediate is placed against and in pressure-contact with the print sheet and at the focus of the light image, and is exposed to the latter through a first color filter. The photosensitive surface is then made infra-red-absorptive at the non-light-struck image-defining areas, and is briefly exposed to intense radiation rich in infra-red. A dye of a color complementary to that of the first color filter is thereby transferred at the background areas to the print sheet. The first intermediate and first color filters are replaced and the process repeated with second and third sets of intermediates and color filters to produce the completed print, which is then removed.

The several intermediates are preferably combined in a single elongate sheet material, a portion of which is shown in FIG. 2. The sheet 10 comprises a thin film backing 11 coated on one surface with a photosensitive, in this case a photoconductive, layer 12 and on the other with a thin conductive sub-coat 13 of vapor deposited aluminum and with a succession of dye coatings 14, 15, 16.

The following example, in which all proportions are in parts by weight unless otherwise noted, will serve further to illustrate but not to limit the invention.

EXAMPLE 1

Color separation negatives of a full color original are produced on silver halide panchromatic photographic film using separately green, blue and red filters, the negatives being carefully marked for registry. The latent image is developed to a visible image by conventional photographic wet development means. From each negative there is prepared a positive diazo lithographic printing plate, and a print of each plate is made with black ink on white paper.

As a receptor or print sheet is used a commercial copy-sheet having a coating comprising silver behenate, zinc oxide, terpene resin, polyvinyl acetate and cellulose acetate on white paper, obtainable under the trade designation "Type B Systems Paper." An alternative receptor or print sheet may be obtained by coating white paper with a thin layer of poly-t-butylmethacrylate, together with powdered inert filler, if desired, applied from acetone and dried.

A series of dye transfer sheets is prepared by coating thin paper with a solution of appropriate dye, binder and filler in a solvent and then drying. A first dye transfer sheet is placed over the surface of the print sheet, followed by a first color separation print with the printed areas disposed outwardly, and the composite is briefly exposed to intense infra-red radiation in a thermographic copying machine. The color separation print and dye transfer sheet are replaced by a second print and sheet representing a second color separation, and with the print placed in registry with the position of the previous print, as determined by the registry marks provided for the purpose; and the composite is again irradiated. The process is repeated with the third color separation print and dye transfer sheet. There is produced a final print in full color. Surprisingly, the later applications do not appear to produce any change in the intensity of the previously applied dyes, nor to cause any blurring or migration of image; and a true color continuous-tone copy of the original is obtained. The colored areas appear gratifyingly clear and intense and are free of any noticeable blurring. Additional full color prints may be prepared from the same color separation prints by repeating the process using new color transfer sheets and print sheets.

The dye coatings contain 2.3 parts of dye in 16.3 parts of polyvinylidine chloride binder, dissolved in 81.4 parts of 2-butanone to make a coatable mixture, and are applied at a coating weight, after drying, of 7.5 grams/sq.ft. Specific dyes which have given good results, together with their color and the color of the appropriate filter employed in making the corresponding color separation print, are listed in the following tabulation.

| filter | | dye color | dye identity |
| --- | --- | --- | --- |
| green | (No. 98) | magenta | p-tricyanovinyl-N,N-dibutyl-aniline |
| blue | (No. 58) | yellow | Sudan Yellow GR Concentrate |
| red | (No. 25) | cyan | DuPont Oil Blue A |

Among other dyes which have been found suitable for the preparation of color copies by the process described may be mentioned Sudan Yellow RRA, Sudan Yellow GGA, Special Red S Conc., and Smoke Green NO. 1.

EXAMPLE 2

A light-image is obtained by projection from a photographic negative color transparency. Color separation prints are prepared on thin photographic silver halide print paper using green, blue and red filters for the separation. The latent images are developed by wet photographic processes and the sheets are dried. The back surface of each sheet is then coated with the complementary dye mixture as described in Example 1. The three color separation prints are separately placed in registry on a print sheet as described in Example 1, and irradiated, causing transfer of the dyes and formation of a full positive color record of the original.

EXAMPLE 3

A strip of paper is segmentally coated with a succession of dye transfer compositions. Separately, a thin transparent film is coated with powdered indium oxide and butadiene styrene copolymer, applied as a mixture in a volatile solvent and then dried and dark-adapted. The photosensitive sheet is placed over a first colored segment of the dye transfer sheet which in turn is placed over a print sheet, the three being held together in heat-conductive pressure-contact. The photosensitive surface is exposed to a color separation image from a full color negative transparency and then to intense infra-red radiation. The dye transfer sheet is advanced to place a second color segment between the other two sheets. After the top sheet has been adequately dark-adapted, it is exposed to a second complementary color separation image and then again exposed to infra-red. The process is repeated with the third dye transfer segment and the third complementary color separation image. A positive full color record of the colored original light image is obtained.

Substitution of silver carbonate for the indium oxide produces a photosensitive coating having similar properties and which will dark-adapt in less time than is required with indium oxide.

The photosensitive material may be in the form of a coated sheet or top-coating which is coextensive with the sheet carrying the several dye source areas so that intermediate dark-adapting is not required.

EXAMPLE 4

A. Adjacent sections of a photoconductive, panchromatic, zinc oxide coated thin paper as used in the electrostatic copying process are each coated on the reverse surface with a different dye transfer coat. The sections are separately exposed to the appropriate color separation image obtained from a full color negative transparency through an appropriate filter. Each photosensitive surface after exposure is developed by the application of toner powder, which remains affixed to the light-struck area but is removed from the remaining areas with an air blast. The thus imaged sections are consecutively placed in pressure-contact with the coated surface of a print paper, and in registry, and are briefly exposed to intense infra-red radiation, resulting in transfer of dye to the print sheet from areas corresponding to the powdered image areas. The result is a full color positive record of the negative original.

B. A similar effect may be obtained by developing radiation-absorptive areas on the exposed photoconductive surface by an electroplating procedure using an electrolytic developing solution containing metallic salts and applied with a conductive sponge or brush at an appropriate potential difference. In this modification the photoconductive coating is carried on a laterally conductive laminate of paper and very thin metal foil.

C. In a preferred procedure the light image from a positive color print original is directed toward a print sheet supported against a grounded platen and in fixed position with respect to the image source. A first segment of the photoconductive color transfer intermediate is pressed against the print sheet at the focus of the light-image, and is exposed through an appropriate color filter. A conductive roller carrying a coating of conductive radiation-absorptive toner particles and at a high potential is passed over the exposed surface. A layer of particles is retained on the photosensitive surface at the nonlight-exposed areas but not at the exposed areas. This process of toning has been described, e.g. in Belgian Pat. No. 680,870 dated July 15, 1966.

The segment is retained in place against the print sheet while the surface is irradiated with infra-red to cause transfer of color material to the print sheet, and is then removed. The process is repeated, with additional photosensitive color transfer sheet segments and with other appropriate filters, to provide a positive color copy of the colored original. The photosensitive color transfer segments are supplied in continuous strip form and are synchronized with the color filters to permit continuous automatic machine operation. Apparatus and print sheets useful in such continuous process are the subjects of applications Ser. No. 728,169, filed May 10, 1968, and Ser. No. 728,230, filed May 10, 1968.

Additional copies may be prepared from the same set of segments of the color transfer intermediate by placing the segments sequentially in registry on additional print sheets and again exposing them to infra-red radiation, to the point at which the dye has been exhausted from one or more of the segments. Where several copies are thus to be prepared, the dye coatings may contain relatively large amounts of dye per unit area. For use in making single prints the dye transfer layers will ordinarily contain the minimum of dye required to produce an adequate transfer image. Again, the amount of binder associated with the dye should be sufficient to avoid offsetting of the dye-containing coating to the print sheet during separation of the two, but not so great as to prevent volatilization and transfer of dye at a rate sufficient to produce the required image density. As an illustration using the three specific dyes of Example 1 and with ethyl cellulose as the binder, best results are obtained with one part of magenta, 1½ parts of yellow, and three parts of cyan dye to eight parts of binder, applied at a weight of about one gram per square foot. Up to 10 parts of binder may be used while still achieving full image density, while as little as four parts of the binder prevents offsetting. Coating weights of from as little as about 0.2 g./sq.ft. up to as much as 7 or 8 grams have been found useful.

EXAMPLE 5

The procedure described in Example 2 is followed in this instance except that the photosensitive coating contains silver bromide dispersed in vinyl chloride:vinyl acetate copolymer binder resin and is capable of forming an infra-red-absorbing image by light exposure alone and without subsequent wet development. Extended time of exposure to each of the several color separation images is required, but adequate thermographic color transfer and an effective three color image are obtained.

EXAMPLE 6

Three color-selective photosensitive films are prepared by coating polyester base film with compositions containing 0.155 part of 1-hydroxy-4-methoxynaphthalene and various amounts of spectral sensitizing dyes, in each instance in 10 parts of a solution of five parts of ethyl cellulose binder in five parts of n-butanol and 90 parts of acetone, applied at a coating thickness, before drying, of 3 mils.

Each photosensitive sheet is separately exposed to the full color light-image projected by reflection from a colored opaque original, and is then heated in contact with an image sheet coated with a composition comprising silver behenate, phthalazinone toner, zinc oxide pigment, terpene resin, polyvinyl acetate and cellulose acetate, obtainable under the trade designation "Type 607 Receptor Sheet." A black infra-red absorptive negative color separation record is produced. The image sheets are then separately lightly coated over the reverse surface with a solution of a binder containing a complementary dye, applied by spray coating. The sheets are separately placed in registry and with the dye-coated surface against a print sheet carrying a thin film of poly-t-butylmethacrylate and powdered silica, and irradiated to cause transfer of dye. A full-color print is produced.

The following tabulation provides the identity of the sensitizer dye and the proportionate amount used in the photosensitive coating, and the color of the transfer dye applied to the corresponding image sheet.

| sensitizer | parts | transfer dye |
|---|---|---|
| acetosol yellow RLS | .12 | yellow |
| erythrosin B | .019 | magenta |
| Mg phthalocyanine | .022 | cyan |

The spectrally sensitized coatings may be combined with the co-reactant sub-coating and the complementary dye coatings in an integral sheet for use in a continuous automatic process analogous to that indicated in connection with Example 4-C.

Analogously, the photosensitive component of Example 6 may be panchromatically sensitized and the required color separations then made by means of appropriate separate filters.

EXAMPLE 7

A print sheet is prepared by coating a transparent polyester film base on one surface with a composition containing both an acid-reactive and an oxidizable color-forming reactant, and on the opposite surface with a different oxidizable color-former, together with a transparent binder in each instance, to form a transparent and essentially colorless sheet. The acid-reactive material is identified as (I) the compound N-n-butyl-N-[bis(4-dimethylaminophenyl)-methylene]-urea, which when acidified forms a magenta dye. The other materials are identified as (II) the compound benzoyl leuco methylene blue which on oxidation provides a cyan dye, and (III) the compound 3,3'-di-tert.-butyl-4,4'-dihydroxy-5,5'-di-t-butylbiphenyl which is oxidizable to a yellow dye.

Color separations are obtained from a colored original on photosensitive intermediates as previousy described. Transfer sheets are separately prepared by coating thin heat-resistant polyester film with heat-transferable reactant material, also in polyvinylidenechloride binder. One transfer coating contains 5 parts of salicylic acid in 10 parts of binder, with the further addition of two parts of powdered glass, applied from methylethyl ketone (83 parts) at a wet thickness of three mils. The other two are prepared each from a solution of 0.08 part of 2,3-dichloro-5,6-dicyano-p-benzoquinone in ten parts of five percent solution of ethyl cellulose in methylethyl ketone, similarly applied. The exposed photosensitive intermediates are developed to form preferentially infra-red-absorptive image-defining areas and the intermediates are then separately held in registry with the print sheet, with an appropriate transfer sheet either sandwiched between the two or held against the reverse surface of the print sheet as required by the position of the corresponding color-forming component, and the composite is irradiated to cause transfer of reactant. A full color transparency copy is obtained, which is particularly useful in projecting a color image.

The amounts per unit area of the several reactants are controlled to provide proper color balance with a minimum of material, and will vary with different reactants and co-reactants, different binders, different concentrations of binders and of other components, and with other variables. By way of illustration, using the components of Example 7, useful results have been obtained when the first print sheet coating contains 2 parts of compound I and 10 parts of compound II in 2000 parts of a 10% solution of "VYHH" polyvinylchlorideacetate binder in methylethylketone, the second coating contains 10 parts of compound III in the same amount of the same binder solution, and both solutions are applied at a wet coating thickness of 3 mils. The coating weights of the three reactants are therefore approximately 0.006, 0.03, and 0.03 gram/sq.ft. respectively.

EXAMPLE 8

A print sheet is prepared on a bond paper backing. The paper is first coated with a solution containing 10 parts of a 10% solution of polyvinylchlorideacetate in methylethylketone and one part each of a color precursor and an activator. The color precursor has the structural formula

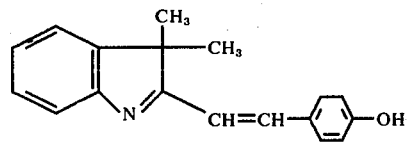

and is available under the trade designation Color Precursor No. X-4405. The activator consists of tetramethyl guanidinium trichloroacetate to which is added just enough water to obtain a solution and sufficient trichloroacetic acid to bring the acidity of the solution to pH 2 to 3. The coating thickness is three mils. The dried coating is essentially colorless but converts to a yellow color when strongly heated.

A first photosensitive intermediate is placed against the print sheet, and exposed to the light beam from a colored positive original through a blue filter. The non-light-struck areas are made preferentially infra-red absorptive and are exposed to intense infra-red. The resulting heat pattern is conducted through the intermediate and produces a corresponding yellow color pattern in the print sheet.

The sheet is next top-coated with a solution containing polyvinylchloride-acetate and compounds I and II as described under Example 7, again at a wet thickness of three mils, and again dried.

A second photosensitive intermediate, having on the reverse surface a layer of volatilizable oxidizer, is placed against the print sheet and exposed to the light beam through a red filter and is then developed and irradiated, causing formation of a cyan color pattern. A third intermediate is similarly processed using a green filter and transfers a volatilizable acid to cause formation of a magenta color pattern. The three color patterns are in registry. The infra-red radiation supplied to the latter two intermediates is sufficient to cause transfer of the reactants but is less than that required with the first intermediate in forming the yellow image. A full color copy is produced.

The acid and oxidizer transfer coatings are prepared as described under Example 7.

EXAMPLE 9

The print sheet is a bond paper coated with a composition consisting of twenty parts of a 10% solution of "VYHH" polyvinyl chlorideacetate in methylethylketone, one part of "Color Precursor No. 1", and two parts of acid-free titanium dioxide. "Color Precursor No 1" is identified as N-(bis(4-dimethyl-aminophenyl)-methyl)-pyrrolidine.

Separate sheets of one-half mil "Mylar" polyester film are coated with, respectively, salicylic acid, yellow transfer dye, and magenta transfer dye, each in ethyl cellulose binder, to serve as color material transfer sheets.

Color separations are prepared photographically from a colored original and corresponding differentially radiation-absorptive imaged sheets are prepared by offset printing, all as described in connection with Example 1. Each of the imaged sheets is placed with the appropriate transfer sheet against the print sheet and in registry with any previous prints, and exposed to infra-red radiation. A full color copy of the original is produced.

What is claimed is as follows:

1. A method for making a multicolor print from a multicolor original comprising:
   a. holding said original and a print sheet in mutually optically fixed position;
   b. inserting a photosensitive intermediate into the optical path between said original and said print sheet;
   c. forming a pattern, corresponding to a first color separation of said original, on the photosensitive intermediate;
   d. utilizing said pattern on said intermediate to form a first colored pattern on said print sheet without changing the relative position of said intermediate with respect to said print sheet;
   e. repeating steps (b), (c) and (d) at least one more time to form at least a second colored pattern on said print sheet;

whereby said colored patterns are in registry on said print sheet.

2. Method of claim 1 wherein color separation is achieved by means of color filters.

3. Method of claim 1 wherein color separation is achieved by means of selective spectral sensitization of a photosensitive sheet material.

4. Method of claim 1 wherein the photosensitive intermediate becomes infra-red-absorptive on exposure to light.

5. A method in accordance with claim 1, wherein said pattern on said intermediate is infrared-absorptive.

6. Method of claim 5 wherein the photosensitive intermediate becomes infra-red-absorptive when heated following exposure to light.

7. A method in accordance with claim 1, wherein at least one of said colored patterns comprises a volatilizable dye.

8. A method in accordance with claim 1, wherein at least one of said colored patterns comprises a volatilizable co-reactant for a color progenitor reactant present in said print sheet.

9. A method in accordance with claim 1, wherein at least three colored patterns are produced on said print sheet in registry.

10. A method in accordance with claim 1, wherein said intermediate has a photoconductive layer on one surface thereof.

11. A method in accordance with claim 10, wherein a color-forming material is contained on the surface of said intermediate opposite said photoconductive layer.

12. A method in accordance with claim 10, wherein said pattern on said intermediate is made infrared absorptive by application thereto of a developer.

13. Method of claim 12 wherein the developer is a powder.

14. Method of claim 12 wherein the developer is a liquid.

15. A method in accordance with claim 1, wherein said pattern is in the form of highly radiation-absorptive background areas and significantly less absorptive image areas and wherein said color-forming material is complementary to said color separation.

16. A method in accordance with claim 10, wherein step (c) includes placing said intermediate against a grounded print sheet, exposing said intermediate to a monocolor light image, and applying electrically conductive radiation-absorptive developing powder at high potential to said intermediate to selectively deposit said powder at the non-light-exposed areas.

* * * * *